United States Patent
Lin

(10) Patent No.: US 11,057,080 B2
(45) Date of Patent: Jul. 6, 2021

(54) SOFTWARE-DEFINED MASSIVE MULTI-INPUT MULTI-OUTPUT (MIMO)

(71) Applicant: North Carolina State University, Raleigh, NC (US)

(72) Inventor: Shih-Chun Lin, Raleigh, NC (US)

(73) Assignee: North Carolina State University Office of Research Commercialization, Raleigh, NC (US)

( * ) Notice: Subject to any disclaimer, the term of this patent is extended or adjusted under 35 U.S.C. 154(b) by 0 days.

(21) Appl. No.: 16/875,252

(22) Filed: May 15, 2020

(65) Prior Publication Data

US 2020/0366341 A1 Nov. 19, 2020

Related U.S. Application Data

(60) Provisional application No. 62/849,528, filed on May 17, 2019.

(51) Int. Cl.
*H04W 24/02* (2009.01)
*H04B 7/0413* (2017.01)
*H04W 88/08* (2009.01)

(52) U.S. Cl.
CPC .......... *H04B 7/0413* (2013.01); *H04W 24/02* (2013.01); *H04W 88/085* (2013.01)

(58) Field of Classification Search
CPC ...... H04B 7/024; H04B 7/026; H04B 7/0413; H04W 24/02; H04W 88/085
See application file for complete search history.

(56) References Cited

U.S. PATENT DOCUMENTS

| | | | |
|---|---|---|---|
| 9,572,197 B1 * | 2/2017 | Wurtenberger | H04W 72/04 |
| 10,091,093 B2 | 10/2018 | Luo et al. | |
| 10,153,974 B2 | 12/2018 | Luo et al. | |
| 2015/0244430 A1 * | 8/2015 | Shattil | H04L 5/0023 370/254 |
| 2017/0064698 A1 * | 3/2017 | Fujinami | H04W 72/0486 |
| 2020/0008271 A1 * | 1/2020 | Pennington | H04L 69/08 |

OTHER PUBLICATIONS

Towards Software-Defined Massive MIMO for 5G&B Spectral-Efficient Networks by Shih-Chun Lin, and Harini Narasimhan dated May 18, 2018 (Year: May 2018).*

(Continued)

*Primary Examiner* — Siu M Lee
(74) *Attorney, Agent, or Firm* — Thomas | Horstemeyer, LLP

(57) ABSTRACT

Disclosed are various embodiments for providing a spectrally efficient communication network using clustered devices and virtualized resources in a multi-input multi-output (MIMO) environment. A plurality of remote radio heads (RRHs) can be connected to a central base band unit (BBU) pool of a software-defined network (SDN) associated with the communication network. A procedure can be performed to yield a design for software-defined massive MIMO subject to a plurality of constraints. The design provides a plurality of clusters comprising the RRHs and an association of user devices to the clusters. Examples of initiating implementation of the design by the SDN are provided.

19 Claims, 6 Drawing Sheets

(56) References Cited

OTHER PUBLICATIONS

Jose et al. "Pilot Contamination and Precoding in Multi-Cell TDD Systems", IEEE Transactions on Wireless Communications, vol. 10, No. 8, Aug. 2011.
C-RAN "The Road Towards Green RAN", White Paper Version 2.5 (Oct. 2011).
Hoydis et al. "Massive MIMO in the UL/DL of Cellular Networks: How Many Antennas Do We Need?", IEEE Journal on Selected Areas in Communications, vol. 31, No. 2, Feb. 2013.
Gran et al. "Towards Wireless Infrastructure-as-a-Service (WIaaS) for 5G Software-Defined Cellular Systems", IEEE ICC 2017 SAC Symposium Cloud Communications and Networking Track.
Akyildiz et al. "Wireless software-defined networks (W-SDNs) and network function virtualization (NFV) for 5G cellular systems: An overview and qualitative evaluation", Computer Networks 93 (2015) 66-79.
Liu et al. "Highly Efficient 3-D Resource Allocation Techniques in 5G for NOMA-Enabled Massive MIMO and Relaying Systems", IEEE Journal on Selected Areas in Communications, vol. 35, No. 12, Dec. 2017.
Lin et al. "Dynamic Base Station Formation for Solving NLOS Problem in 5G Millimeter-Wave Communication", IEEE INFOCOM 2017—IEEE Conference on Computer Communications.
Akyildiz et al. "5G roadmap: 10 key enabling technologies", Computer Networks 106 (2016) 17-48.
Yap et al. "Blueprint for Introducing Innovation into Wireless Mobile Networks", VISA 2010, Sep. 3, 2010, New Delhi, India, Copyright 2010 ACM 978-1-4503-0199-2/10/09.
Cheng et al. "Joint Network Optimization and Downlink Beamforming for CoMP Transmissions Using Mixed Integer Conic Programming", IEEE Transactions on Signal Processing, vol. 61, No. 16, Aug. 15, 2013.
Akyildiz et al. "SoftAir: A software defined networking architecture for 5G wireless systems", Computer Networks 85 (2015) 1-28.
Lin et al. "Towards Software-Defined Massive MIMO for 5G&B Spectral-Efficient Networks", 2018 IEEE.

* cited by examiner

250

```
Algorithm 1: GA-based Dynamic RRH Clustering.
1  for each C ∈ C do
2      Set t := 0. Generate and evaluate P_C(0).
3      while stopping criterion has not been satisfied do
4          Select M_C(t) from P_C(t).
5          Crossover and mutate M_C(t) to form
             P_C(t + 1).
6          Set t := t + 1. Evaluate P_C(t).
7      end
8      Update R^tot(C; {I*_u,α_u}) from the best of P_C(t).
9  end
10 Yield (C*; {I*_u,α_u}) = arg max_{C∈C} R^tot(C; {I_u,α_u}).
```

SOFTWARE-DEFINED MASSIVE MULTI-INPUT MULTI-OUTPUT (MIMO)

CROSS-REFERENCE TO RELATED APPLICATION

This application claims priority to and the benefit of, U.S. Provisional Application No. 62/849,528, filed on May 17, 2019, entitled "SOFTWARE-DEFINED MASSIVE MULTI-INPUT MULTI-OUTPUT (MIMO)," the entire contents of which is hereby incorporated herein by reference.

BACKGROUND

The search for higher data capacity in communication networks has led to improvements such as massive multi-input multi-output (MIMO) which allows system capacity to be theoretically increased by simply installing additional antennas to remote radio heads (RRHs). However, availability of massive channel state information (CSI) at the transmitter side as well as co-channel interference from aggressive reuse greatly limit the spectral efficiency of massive MIMO. Software-defined networking approaches can minimize some but not all of these drawbacks, for example by enabling coordination among densely-deployed RRHs equipped with a large number of antennas. Communication networks that implement conventional massive MIMO or software-defined networking approaches suffer from reduced spectral efficiency due to availability of massive CSI, co-channel interference, intra-/inter-cluster and pilot contamination induced interference.

BRIEF DESCRIPTION OF THE DRAWINGS

For a more complete understanding of the embodiments and the advantages thereof, reference is now made to the following description, in conjunction with the accompanying figures briefly described as follows.

Figure 1:
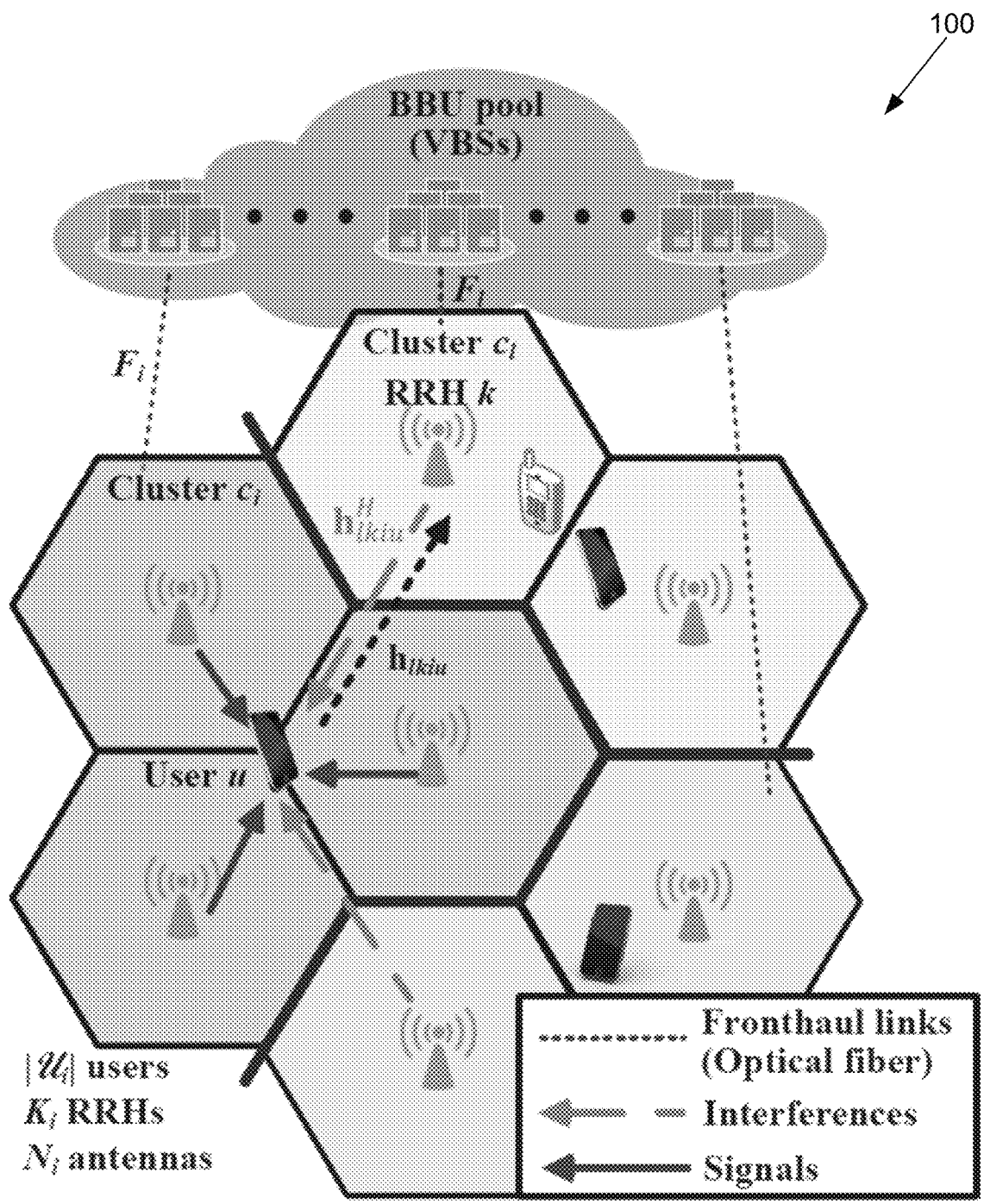
FIG. 1 illustrates a software-defined massive MIMO framework including an architecture with optimization or improvement of clustering of distributed densely-deployed RRHs according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Disclosed herein are various examples related to providing a spectrally efficient communication network using clustered devices and virtualized resources in a massive multi-input multi-output (MIMO) environment. Massive MIMO can include a base station or transmitter side resource, for example, that utilizes more than eight antennas (and sometimes as many as 128, 256, or more), and can also include user equipment devices (UEs) that utilize around eight antennas. Availability of massive channel state information (CSI) at the transmitter side as well as co-channel interference from aggressive reuse greatly limit the spectral efficiency of massive MIMO such as when used as an enabling technology in a 5G and beyond (5G&B) communication network. Software-defined networking can minimize some of these drawbacks (e.g., by virtualizing resources, providing centralized control, or facilitating the implementation and aggregation of virtual base stations (VBSs) at the central base band unit (BBU) pool). Examples of a wireless architecture and features for applying software-defined networking to wireless domains are described by I. F. Akyildiz, P. Wang, and S.-C. Lin in "SoftAir: A software defined networking architecture for 5G wireless systems," Computer Networks, vol. 85, pp. 1-18, 2015, which is incorporated by reference herein in its entirety. The SoftAir approach can provide an architecture that enables coordination among densely-deployed remote radio heads (RRHs) equipped with a large number of antennas, such as by clustering RRHs and/or providing low-latency high-bandwidth links to connect RRHs to the BBU pool and support accurate, high resolution synchronization among RRHs. The examples disclosed herein can enhance macro-diversity (e.g., network) massive MIMO in a software-defined cellular architecture.

A software-defined massive MIMO is disclosed herein that provides dynamic macro-diversity in massive MIMO with respect to a time-varying distribution of users of a communication network. The software-defined massive MIMO includes a procedure that identifies a configuration of resources and an association of the users to the configuration to provide spectral efficiency to the communication network. In some examples, a computing device defines a configuration of clusters formed from RRHs available to the communication network, and an association of users to the clusters. The disclosed procedure can optimize RRH clustering pattern and RRH-user associations while satisfying system-level constraints. An iterative, global search algorithm is disclosed that exploits genetic algorithms and yields solutions in only a few rounds. The software-defined massive MIMO can exhibit the positive features of maximizing network capacity by mitigating the impact of intra-cluster interference, inter-cluster interference, or pilot contamination induced interference.

In some examples, a system for providing a spectrally efficient communication network using clustered devices and virtualized resources in a MIMO environment is provided. At least one application, such as a definition application or a configuration application, is executable in at least one computing device. The at least one application can cause the computing device to define a configuration of clusters formed from RRHs available to a communication network, and an association of users to the clusters to jointly mitigate impact of interference and pilot contamination. The at least one application can also cause the configuration of the RRHs into the clusters, and cause the association of users to the clusters. The system achieves a sum-rate improvement in every time slot by dynamically forming the clusters.

In other examples, a method is provided. The method includes identifying resources that are available to a communication network. The communication network can be associated with a software-defined network, and as such can include RRHs, virtual base stations (VBSs), and/or base band units (BBUs). The method also includes identifying users associated with the communication network. The method further includes determining a configuration of the resources and an association of the users to the configuration to provide spectral efficiency to the communication network. The method provides dynamic macro-diversity massive MIMO with respect to a time-varying distribution of the users. For example, the determining can be based at least in part on a genetic algorithm.

In the disclosed concept, it is understood that a number of technical problems exist with regard to use of massive MIMO and software-defined networks as enabling technologies to provide a spectrally efficient 5G&B communication network. Conventional communication networks suffer from reduced spectral efficiency due to availability of massive channel state information (CSI), co-channel interference, intra-/inter-cluster and pilot contamination induced interference, among other technical problems evident from the discussion herein. The methods and systems disclosed solve one or more technical problems by implementing a procedure that can search for a configuration of resources and an association of users to the configuration to provide spectral efficiency to the communication network. The disclosure further solves a technical problem by causing the configuration of the resources and the association of the users to the resources following applying the procedure to determine a design for a software-defined massive MIMO to provide an improved spectral efficiency to the communication network.

INTRODUCTION

As a key enabling technology for 5G&B systems, massive MIMO allows the system capacity to be theoretically increased by simply installing additional antennas to RRHs. However, this innovative technology cannot support higher data capacity without accurate channel state information and interference handling, especially for multi-cell scenarios. In this disclosure, the dynamic macro-diversity (e.g., network) massive MIMO is treated from the perspective of software-defined cellular architecture. The so-called software-defined massive MIMO is introduced, which dynamically coordinates highly-deployed RRHs equipped with massive antennas so that the improved or maximum spectral efficiency can be achieved. First, the software-defined cellular architecture is presented, where distributed massive antenna systems with centralized control and time-division duplexing massive MIMO are investigated. Next, in this considered architecture, a rigid analysis of achievable ergodic user sum-rates is given for macro-diversity massive MIMO schemes. An optimization framework of software-defined massive MIMO is further disclosed that optimizes RRH clustering pattern and RRH-user associations while satisfying system-level constraints. To address the NP-complete problem of the optimal framework design, an iterative, global search algorithm is developed that exploits genetic algorithms and yields satisfactory solutions in only few rounds. Performance evaluation validates the efficacy of the disclosed solution which facilitates universal frequency reuse for 5G&B wireless networks.

To uphold explosive proliferation of wireless devices and drastically increased mobile traffic, 5G and beyond (5G&B) systems are expected to support a 100-fold improvement in user-experienced throughput, targeting 10 Gbps peak rates and 100 Mbps cell-edge rates. Facing this evolved trend together with scarce radio spectrum, new enabling technologies such as massive MIMO have great potential to be exploited. Specifically, using the same radio resources but different spatial patterns of the large-scale antenna array, massive MIMO can simultaneously transmit high-speed data streams to multiple users. However, the availability of massive CSI at the transmitter side as well as co-channel interference from aggressive reuse greatly limit the actual spectral efficiency.

Recently, software-defined networking has emerged that decouples the control message plane from the user data plane and efficiently creates centralized network abstraction with the programmability provisioning over the entire network. By applying the software-defined networking into wireless domains, a new cellular architecture, namely SoftAir, for next-generation cellular networks is introduced to enable flexible architectural and algorithm designs. It brings the centralized, decoupling wireless architecture that allows real-time network information accessibility and global optimized control. The cooperativeness of SoftAir also facilitates the implementation and aggregation of virtual base stations (VBSs) at the central base band unit (BBU) pool to enhance the system performance via joint orchestration/optimization.

Based on the SoftAir architecture, this disclosure aims to facilitate universal frequency reuse in the entire 5G&B system by introducing dynamic massive antenna clustering, which can eliminate inter-cluster interference and can achieve enhanced or optimal system spectral efficiency. First, while equipping each RRH with a large number of antennas, the disclosed systems and methods can apply the SoftAir architecture to enable an efficient coordination among densely-deployed RRHs and construct distributed massive antenna systems. Due to the merit of channel reciprocity, the time-division duplexing (TDD) massive MIMO scheme can be preferable to the counterpart of the frequency-division duplexing (FDD) mode. Next, the disclosed systems and methods provide a rigid performance analysis of given RRH clustering systems, formed by grouping the RRHs into clusters with macro-diversity (e.g., network) massive MIMO. The imperfect channel estimation, pilot contamination, path loss, and antenna correlation are considered, and asymptotic achievable user sum-rate is derived with linear eigenbeamforming precoders.

The disclosed systems and methods further introduce a software-defined massive MIMO framework that enhances or maximizes the achievable spectral efficiency while considering constraints for realistic SoftAir and high density RRH deployments. The framework aims at finding a desirable (or the best) RRH clustering pattern and RRH-user associations, which mitigate the impact of intra-/inter-cluster and pilot contamination induced interference concurrently. Moreover, to address the NP-complete problem of optimal framework design, this disclosure proposes a procedure including an iterative algorithm (e.g., genetic algorithm (GA)-based dynamic RRH clustering) operated at the BBU pool, which obtains satisfactory solutions in a fast-convergent manner. Numerical results validate the efficacy of macro-diversity massive MIMO with densely-deployed RRHs, and confirm the superiority of the disclosed dynamic clustering that provides the optimal user sum-rate with given SoftAir configurations. This work appears to be the first to propose a coherent software-defined massive MIMO framework that can eliminate inter-cluster interference and achieve remarkable sum-rate performance for 5G&B spectral-efficient networks.

Notations: Throughout this disclosure, bold uppercase and lowercase letters denote matrices and vectors, respectively ($I_N$ denotes the identity matrix with size N). $\mathbb{C}$ denotes the set of complex numbers. $\mathbb{E}[\cdot]$ denotes the expectation operator. $A^T$, $A^H$, and trA represent the transpose, Hermitian, and trace of matrix A, respectively. $\mathcal{CN}$(m, R) denotes the circular symmetric complex Gaussian distribution with mean m and covariance matrix R.

5G&B Spectral-Efficient Networks

A. Distributed Massive Antenna Systems

With reference to FIG. 1, shown is a software-defined massive MIMO framework 100 including an architecture with optimization or improvement of clustering of distributed densely-deployed RRHs according to various embodiments of the present disclosure. Portions of the software-defined massive MIMO framework 100 can be implemented using a software-defined cellular architecture, SoftAir, or any suitable software-defined network. SoftAir, a software-defined cellular architecture, has been recognized as an integrated solution of cloud-RAN (C-RAN) and coordinated multi-point (CoMP), which decouples data plane and control plane for centralized network control and has the capability of maximizing spectral efficiency based on its open platform. As shown in FIG. 1, SoftAir can include three main parts: (i) the BBU pool, which hosts and manages VBSs, e.g., virtual machines running software-implemented baseband processing functions as the PHY/MAC protocols, (ii) RRHs equipped with possibly massive antennas, which are controlled by VBSs and serve users' transmissions, and (iii) low-latency high-bandwidth optical fibers, which connect the RRHs to the BBU pool and support accurate, high-resolution synchronization among RRHs. SoftAir can form VBSs associated with any cluster of RRHs to mitigate the cluster-edge effect (e.g., the users at the edges of a cluster suffer from severe out-of-cluster interference), which can provide delay-free CSI exchange. In other words, SoftAir architecture allows 5G&B networks to approach the theoretically-optimal linear scaling of network capacity by enabling innovative designs of precoders/detectors/estimators in the BBU pool due to VBS programmability, aggressively deploying a large number of low-cost RRHs for constructing distributed antenna systems, and facilitating diverse cooperation modes among the RRHs.

Let $\mathcal{K}$ and $\mathcal{U}$ denote the sets of RRHs and users in a cellular network, respectively. Also, let $c_i \subset \mathcal{K}$ be the ith subset of $\mathcal{K}$, which connects to the BBU pool via a fronthaul link with the predetermined capacity $F_i$. In the cluster $c_i$, there are $K_i$ RRHs equipped with total $N_i$ antennas (e.g., each of the RRHs has a large number of $N_i/K_i$ antennas) to serve a user subset $\mathcal{U}_i \subset \mathcal{U}$. An RRH clustering pattern C is then defined as a collection of non-empty disjoint subsets of given $\mathcal{K}$, e.g., $$C = \{c_i; \bigcap_{c_i \in C} c_i = \emptyset, \bigcup_{c_i \in C} c_i \subseteq \mathcal{K}\}. \quad (1)$$

Additional constraints due to the practicability of RRH clustering can be further applied, e.g., the pair-distances of all the RRHs in each cluster can be less than a predetermined value from service providers' requests. All possible clustering patterns constitute the pattern set C.

B. TDD Massive MIMO

Figures 2A, 2B:
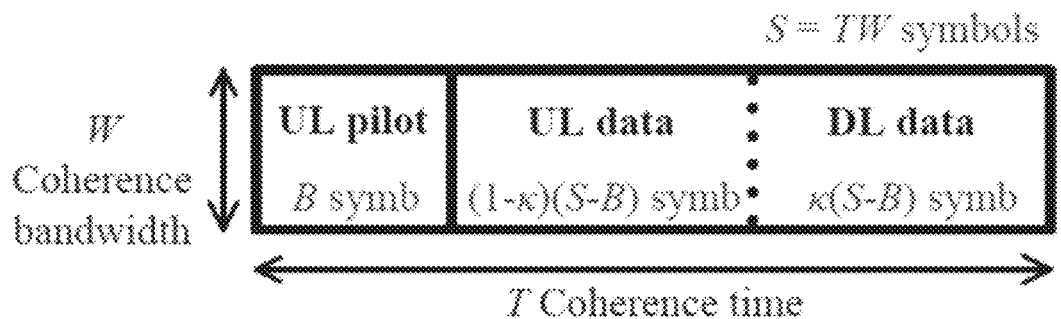
FIG. 2A illustrates a structure for dividing time-frequency wireless resources into frames according to various embodiments of the present disclosure.
FIG. 2B illustrates a procedure for dynamic RRH clustering according to various embodiments of the present disclosure.

Making massive MIMO operate in TDD is a promising technique that acquires timely CSI over FDD. In the TDD mode, due to channel reciprocity, estimation can be done in one direction and used in both uplink and downlink directions, while FDD utilizes respective estimation and feedback for both directions. Also, the cost of uplink training in TDD increases linearly with the number of active users rather than that of antennas, perfectly fitting the massive MIMO scenarios. The disclosed systems and methods focus on the use of TDD massive MIMO schemes in SoftAir, where VBSs in the central BBU pool can easily share CSI associated with different users in the system. Specifically, the time-frequency wireless resources can be divided into frames, where a frame consists of T seconds and W Hz and leaves room of S=TW transmission symbols, as shown in FIG. 2A. In each frame, B≥1 out of the S symbols can be dedicated for uplink pilot signaling; the remaining S−B symbols can be used for payload data where 1−κ and κ denote the fixed fractions allocated for uplink and downlink, respectively.

Assume that T and W is within the coherence time and bandwidth of all users, respectively; thus, all the channels are static in the frames. Let $h_{lkiu} \in \mathbb{C}^{(N_l/K_l) \times 1}$ denote the channel response from user u in cluster $c_i$ to RRH k in cluster $c_l$ in a given frame. By arranging the responses to all the RRHs in cluster $c_l$, one can model the channel vector $h_{liu}$ as $$h_{liu} = [h_{l1iu}^T, \ldots, h_{lK_l iu}^T]^T = R_{liu}^{1/2} \zeta_{liu} \in \mathbb{C}^{N_l \times 1}, \quad (2)$$

where $$R_{liu} := \mathbb{E}\left[h_{liu} h_{liu}^H\right] \in \mathbb{C}^{N_l \times N_l}$$

is deterministic and $\zeta_{liu} \sim \mathcal{CN}(0, I_{N_l})$ is an independent fast-fading channel vector. Preferably, by treating the densely-deployed RRHs in a cluster as a distributed antenna array, and forming a single giant VBS that incorporates all RRH clusters for full cooperation, the inter-cluster interference in SoftAir can be mitigated, enabling optimal and universal frequency reuse factor of one. However, realizing such a fully cooperative system needs to face the realistic network conditions. The following aims at disclosing a procedure for dynamically forming the VBSs (e.g., by dynamically clustering the densely-deployed RRHs), and analyzing how much cooperation gain can be achieved by SoftAir.

Macro-Diversity Massive MIMO

This section presents macro-diversity (e.g., network) massive MIMO via densely-deployed RRHs in SoftAir. This section also investigates channel estimation, downlink data transmissions, and the achievable spectral efficiency.

A. MMSE Channel Estimation

During an uplink training phase in TDD networks, the users in RRH cluster $c_i$ transmit mutually orthogonal pilot sequences which allow the BBU pool to compute the estimate $\hat{H}_{ii}$ of the local channel $H_{ii}$. While the same set of orthogonal pilot sequences might be reused among RRH clusters, the channel estimate can be corrupted by pilot contamination from adjacent clusters. After correlating the received training signals $Y_i^{tr}$ with the pilot sequences $\Psi_i$, the BBU pool can acquire the noisy observation as $$\tilde{Y}_i^{tr} = Y_i^{tr}\Psi_i^H \in \mathbb{C}^{N_i \times |\mathcal{U}_i|} := [\tilde{y}_{i1}^{tr}, \ldots, \tilde{y}_{i|\mathcal{U}_i|}^{tr}], \quad (3)$$

and accordingly can estimate the channel vector $h_{iiu}$. Particularly, the disclosed systems and methods can adopt a minimum mean-square error (MMSE) estimator which gives the MMSE estimate $\hat{h}_{iiu}$ of $h_{iiu}$ as $$\hat{h}_{iiu} = R_{iiu} Q_{iu} \tilde{y}_{iu}^{tr} \quad (4)$$

$$= R_{iiu} Q_{iu} \left( h_{iiu} + \sum_{l \in L_{iu}} h_{ilu} + \frac{1}{\sqrt{\rho_{tr}}} \tilde{n}_{iu}^{tr} \right) \sim \mathcal{CN}(0, \Phi_{iiu}),$$

where $\rho_{tr} > 0$ denotes the effective training signal-to-noise ratio (SNR) and $\tilde{n}_{iu}^{tr} \sim \mathcal{CN}(0, I_{N_i})$, and $L_{iu}$ denotes the set of other clusters that use the same pilot as the one adopted in cluster $c_i$ for user u. $\rho_{tr}$, which can be assumed to be a given parameter, generally depends on the sequence length and transmit power of the pilot. One can also define $\Phi_{ilu}$ and $Q_{iu}$ in Eq. (4) as follows:

$$\Phi_{ilu} = R_{iiu} Q_{iu} R_{ilu}; \quad Q_{iu} = \left( \frac{1}{\rho_{tr}} I_N + \sum_{l \in \{i\} \cup L_{iu}} R_{ilu} \right)^{-1} \quad (5)$$

Applying the orthogonality of the MMSE estimate, the channel vector can be further decomposed as $h_{iiu} = \hat{h}_{iiu} + \tilde{h}_{iiu}$, where $\tilde{h}_{iiu} \sim \mathcal{CN}(0, R_{iiu} - \Phi_{iiu})$ is the uncorrelated (and also statistically independent) estimation error.

B. Downlink Data Transmission

The received downlink signal $y_{iu} \in \mathbb{C}$ of user u in RRH cluster $c_i$ can be provided as $$y_{iu} = \sqrt{\rho} \sum_{l=1}^{|C|} h_{liu}^H s_l + n_{iu} \quad (6)$$

$$= \sqrt{\rho} \sum_{l=1}^{|C|} h_{liu}^H \left( \sqrt{\lambda_l} \sum_{u'=1}^{|\mathcal{U}_l|} w_{lu'} x_{lu'} \right) + n_{iu}$$

$$= \underbrace{\sqrt{\rho \lambda_i} h_{iiu}^H w_{iu} x_{iu}}_{\text{Desired signal}} + \underbrace{\sum_{(l,u') \neq (i,u)} \sqrt{\rho \lambda_l} h_{liu}^H w_{lu'} x_{lu'}}_{\text{Interference}} + \underbrace{n_{iu}}_{\text{Noise}},$$

where $\rho > 0$ denotes the downlink SNR, $s_l \in \mathbb{C}^{N_l}$ is the transmit vector of cluster $c_l$, $n_{iu} \sim \mathcal{CN}(0,1)$ is the receiver noise, $w_{iu} \in \mathbb{C}^{N_i}$ is a precoding vector, $x_{iu} \sim \mathcal{CN}(0,1)$ contains the user data symbol, and parameter $$\lambda_l := \frac{1}{E\left[ \frac{1}{|\mathcal{U}_l|} tr\left( \sum_{u=1}^{|\mathcal{U}_l|} b w_{lu} w_{lu}^H \right) \right]}$$

normalizes the average transmit power per user in cluster $c_l$ to $$E\left[ \frac{\rho s_l^H s_l}{|\mathcal{U}_l|} \right] = \rho.$$

Since users do not have any channel estimate, the disclosed systems and methods aim at yielding an ergodic achievable data rate. One can consider a linear precoder of practical interest, namely eigenbeamforming, which can be defined as $w_{iu} = \hat{h}_{iiu}$ for $u \in \mathcal{U}_i$. Hence, by assuming that the average effective channels $\sqrt{\lambda_i} \mathbb{E}[h_{iiu}^H w_{iu}]$ can be perfectly learned by the user, the ergodic achievable spectral efficiency at user u of RRH cluster $c_i$ can be given as $$R_{iu} = \kappa\left(1 - \frac{B}{S}\right) \log_2(1 + \eta_{iu}) \quad \text{[bit/s/Hz]} \quad (7)$$

with associated signal-to-interference-plus-noise ratio (SINR)

$$\eta_{iu} = \frac{\rho \lambda_i |\mathbb{E}[h_{iiu}^H \hat{h}_{iiu}]|^2}{1 + \rho \lambda_i \text{var}[h_{iiu}^H \hat{h}_{iiu}] + \sum_{(l,u') \neq (i,u)} \rho \lambda_l \mathbb{E}[|h_{liu}^H \hat{h}_{llu'}|^2]}.$$

Note that Eq. (7) is obtained as a net ergodic achievable rate under an assumption of block-fading channel models, where the rate loss due to channel training and the rate for uplink transmissions are both accounted.

C. Asymptotic Analysis of Macro-Diversity Massive MIMO

Since the ergodic achievable rate $R_{iu}$ in Eq. (7) is hard to compute with finite system dimensions, the disclosed systems and methods study the large system limit and accordingly investigate the macro-diversity massive MIMO effect. The notation $N \to \infty$ used in the following refers to $N_i, |\mathcal{U}_i| \to \infty$ such that $\lim \sup_{N_i} |\mathcal{U}_i|/N_i < \infty$ for all $c_i \in C$. That is, the total antenna size and the number of served users in each RRH cluster grow infinitely large while keeping a finite ratio between the two values. One can aim at deriving the deterministic approximation $\bar{\eta}_{iu}$ of the SINR $\eta_{iu}$ with the linear eigenbeamforming precoder such that $$R_{iu} - \bar{R}_{iu} := \kappa\left(1 - \frac{B}{S}\right) \log_2(1 + \bar{\eta}_{iu}) \xrightarrow[N \to \infty]{} 0. \quad (8)$$

Particularly, by respectively examining the signal and interference power of $\eta_{iu}$ with the condition of $N \to \infty$ and the properties of large dimensional random matrices, $$\bar{\eta}_{iu} = \frac{\frac{\bar{\lambda}_i}{N_i} |tr\Phi_{iiu}|^2}{\frac{1}{\rho} + \sum_{l \neq i} \frac{\bar{\lambda}_l}{N_l} |tr\Phi_{liu}|^2 + \sum_{(l,u') \neq (i,u)} \frac{\bar{\lambda}_l}{N_l} tr R_{liu} \Phi_{llu'}}$$

where $$\bar{\lambda}_l := \left(\frac{1}{N_i|\mathcal{U}_i|}\sum_{u=1}^{|\mathcal{U}_i|} tr\Phi_{iiu}\right)^{-1}.$$

The user sum-rate can also be obtained as $\Sigma_{c_i \in c} \sum u \in \mathcal{U}_i \bar{R}_{iu}$.

Case study. A case study is considered with $N_i=N$, $\forall c_i \in \mathcal{C}$ and the same pilot sequences used among all clusters, and with a simplified channel model $$[h_{ii1}, \ldots, h_{ii|\mathcal{U}_i|}] = \sqrt{\frac{N}{D}} A[v_{ii1}, \ldots, v_{ii|\mathcal{U}_i|}] \quad (9)$$

$$[h_{li1}, \ldots, h_{li|\mathcal{U}_i|}] = \sqrt{\alpha\frac{N}{D}} A[v_{li1}, \ldots, v_{li|\mathcal{U}_i|}], l \neq i$$

where $D:=cN$, $c\in(0,1]$ indicates the degree of freedom (DoF) offered by the channel, $A \in \mathbb{C}^{N \times D}$ is composed of $D \leq N$ columns of an arbitrary unitary N×N matrix, $v_{liu} \in \mathbb{C}^{D \times 1}$ is a standard complex Gaussian vector, and $\alpha \in (0,1]$ accounts for an inter-cluster interference factor. Assume that perfect CSI is guaranteed; there is no channel estimation errors (e.g., the scenarios with large training SNR as $\rho_{tr} \gg 1$). $\bar{\eta}_{iu}$ is given in a closed form as:

$$\bar{\eta}_{iu} = \frac{1}{\underbrace{\alpha(\bar{C}-1)}_{\text{Pilot contamination}} + \underbrace{\bar{C}/\rho N}_{\text{Noise}} + \underbrace{|\mathcal{U}_i|\bar{C}^2/D}_{\text{Interference}}} \quad (10)$$

where $\bar{C}:=1+\alpha(|C|-1)$. The results are obtained via some straight-forward but tedious calculations with the channel model in Eq. (9). From Eq. (10), the interference mainly depends on the ratio $D/|\mathcal{U}_i|$ (e.g., the number of DoF per user) rather than directly on the total antenna size N. It implies that only when the environment supports sufficient scattering, the interference can be reduced by adding additional antennas (or RRHs). Moreover, if N, $D\to\infty$ at the same speed, the noise and interference will vanish and the pilot contamination remains as the only performance limitation:

$$\bar{\eta}_{iu} \xrightarrow[N,D\to\infty, |\mathcal{U}_i|/N \to 0]{} \eta_\infty = \frac{1}{\alpha^2(|C|-1)}. \quad (11)$$

Then, the achievable spectral efficiency becomes $$|\mathcal{U}|\kappa\left(1-\frac{B}{S}\right)\log_2(1+\eta_\infty).$$

Note that without pilot contamination (e.g., $\alpha=0$ or $|C|=1$), the SINR will grow to infinity as N, $D\to\infty$. Also, if D is a large fixed value, the SINR will approach a smaller value than $\eta_\infty$, where adding RRHs does not necessarily reduce the interference and can improve the SNR.

Software-Defined Massive MIMO

This disclose introduces dynamic macro-diversity massive MIMO with respect to time-varying user distribution. Specifically, the disclosed systems and methods propose a software-defined massive MIMO optimization framework 100 with the objective to improve or maximize the spectral efficiency, while considering a plurality of constraints (e.g., system-level constraints due to limited fronthaul capacities, and possibly high density RRH deployments).

A. Software-Defined Massive MIMO Optimization Framework

Given a possible RRH clustering pattern $\{c_i \in C; C \in \mathcal{C}\}$ and the user set $\{\mathcal{U}_i; U_{c_i} U_i = \mathcal{U}\}$, one can introduce binary variables $I_{uc_i}$ for all $u \in \mathcal{U}$, $c_i \in C$ where $$I_{uc_i} = \begin{cases} 1, u \in \mathcal{U}_i; \\ 0, u \notin \mathcal{U}_i. \end{cases} \quad (12)$$

These indicators show the assignment between RRH clusters and users. To provide that each user is served by a dedicated RRH cluster, the disclosed systems and methods can include the following association constraint: for each $u \in \mathcal{U}$ $\Sigma_{c_i \in C} I_{uc_i} = 1$. Moreover, as all RRHs are connected to the BBU pool via fronthaul links, $F_i$ is the predetermined link capacity between RRH cluster $c_i \in C$ and the pool. By neglecting the fronthaul capacity consumption for transferring beamforming vector (as compared to major consumption for data streams) and considering the macro-diversity massive MIMO effective from high density RRH deployments, the system-level constraint due to fronthaul capacity can be formulated as: for each $c_i \in C$, $\sum u \in \mathcal{U} \bar{R}_{iu} I_{uc_i} \leq F_i$, where $\bar{R}_{iu}$ is obtained via Eq. (8). So far, this disclosure has successfully characterized the system-level constraints for dynamic macro-diversity massive MIMO. To further realize a spectral-efficient clustering design, this disclosure aims to enhance or maximize the total achievable data rates at users. The user sum-rate is then provided as $$\bar{R}^{tot} := \sum_{c_i \in C} \sum_{u \in \mathcal{U}} \bar{R}_{iu} I_{uc_i} \quad (13)$$

$$= \sum_{c_i \in C} \sum_{u \in \mathcal{U}} \kappa\left(1-\frac{B}{S}\right) \log_2(1+\bar{\eta}_{iu}) I_{uc_i}.$$

Hence, one can define the software-defined massive MIMO framework 100 for 5G&B networks as follows.

Definition 1: The Software-Defined Massive MIMO Framework 100. Given 5G&B networks with the set C of all possible RRH clustering patterns and the user set $\mathcal{U}$, the software-defined massive MIMO framework can be defined as $$\begin{aligned} \text{Find:} & \quad C^* \in C; I^*_{uc_i} \in \{0,1\}, \forall u \in \mathcal{U}, c_i \in C \quad (14) \\ \text{Maximize} & \quad \bar{R}^{tot}(C; \{I_{uc_i}\}) \\ \text{Subject to} & \quad \sum_{c_i \in C} I_{uc_i} = 1, \forall u \in \mathcal{U} \\ & \quad \sum_{u \in \mathcal{U}} \bar{R}_{iu} I_{uc_i} \leq F_i, \forall c_i \in C \end{aligned}$$

The framework 100 aims at finding the optimal RRH clustering pattern and optimal assignments between RRH clusters and users, according to the dynamic user distribution, in such a way that the network capacity can be improved or maximized by jointly mitigating the impact of (i) the intra-cluster interference, (ii) the inter-cluster interference, and (iii) the pilot contamination induced interference. This disclosure proposes a procedure including an iterative algorithm that efficiently realizes software-defined massive MIMO and achieves maximum user sum-rate in only few rounds.

B. Dynamic RRH Clustering

The optimal design problem of software-defined massive MIMO is NP-complete, where an optimal solution is very difficult to compute in a timely manner. Also, due to the complex objective formation (e.g., $\overline{R^{tot}}$), advanced optimization techniques based on the derivatives (e.g. the gradient and/or hessian of the objective function) are not applicable. Facing these challenges, the disclosed systems and methods propose a global, derivative-free search algorithm that can provide satisfactory solutions (even the optimal solution with a high probability) by only few searching iterations. The disclosed systems and methods can adopt the GA method, a randomized and population-based search technique with the roots in genetic principles. This disclosure provides a GA-based RRH clustering algorithm to solve the NP-complete problem.

For each RRH clustering pattern $C \in \mathcal{C}$, the GA procedures are applied: (i) starting with an initial solution set, denoted by initial population $P_C(0)$; (ii) creating a new solution set $P_C(1)$ by performing certain operations on $P_C(0)$; (iii) generating populations $P_C(2)$, $P_C(3)$, ..., until an appropriate stopping criterion is reached. The solution to the clustering improvement or optimization is then obtained as an element of the last-generation population with the largest value of the objective function. The details of the disclosed procedure are provided as follows.

Chromosome coding and initialization. The assignment (e.g., $I_{uc_j}$) of each user-cluster pair is represented as a gene (alphabet) of a binary chromosome string (e.g., $[I_{uc_j}; u \in \mathcal{U}, c_j \in \mathcal{C}]$). The length of chromosomes (e.g., the number of elements in the strings) is set as $|\mathcal{U}||\mathcal{C}|$. The initial population $P_C(0)$ of chromosomes is with population size $N_p$. Given the chromosome coding, $P_C(0)$ is generated by a random selection of a feasible chromosome set, in which each chromosome satisfies the constraints of $\Sigma_{c_j \in C} I_{uc_j} = 1$, $\forall u \in \mathcal{U}$ and $\Sigma_{u \in \mathcal{U}} R_{iu} I_{uc_j} \leq F_i$, $\forall c_j \in C$ from Eq. (14).

Fitness function and selection. To each chromosome there corresponds a fitness value of the objective function, and the GA iteratively optimizes these fitness values of populations at each round. Set the fitness values of feasible chromosomes as their respective user sum-rates and zero values for infeasible chromosomes. With $C \in \mathcal{C}$ and a chromosome $[I_{uc_j}; u \in \mathcal{U}, c_j \in \mathcal{C}]$, the fitness f can be defined as $$f([I_{uc_j}]) = \prod_{u \in \mathcal{U}} \mathbb{1}_{\{\Sigma_{c_j \in C} I_{uc_j} = 1\}} \prod_{c_j \in C} \mathbb{1}_{\{\Sigma_{u \in \mathcal{U}} R_{iu} I_{uc_j} \leq F_i\}} \times \sum_{c_j \in C} \sum_{u \in \mathcal{U}} \overline{R}_{iu} I_{uc_j}, \quad (15)$$

where $I_E$ denotes the indicator function of event E, and $f$ is a nonnegative function. Furthermore, a roulette-wheel selection operation can be adopted which determines the survival chromosomes for the next-generation population according to their fitness values. Specifically, the mating pool set $M_c(t)$ with the same population size $N_p$ can be formed from $P_C(t)$ using a randomization operation as follows: each element $m^t$ in $M_c(t)$ is equal to $p^t$ in $P_C(t)$ with probability $$\frac{f(p^t)}{\Sigma_{p_i^t \in P_C(t)} f(p_i^t)}.$$

In other words, the disclosed systems and methods can select chromosomes into the mating pool with probabilities proportional to their fitness values.

Evolution: Crossover and mutation. The crossover operation involves exchanging substrings of two randomly chosen parent chromosomes to generate a pair of offspring chromosomes. Specifically, one-point crossover can be applied with a crossover probability $p_c$ at a chromosome crossing site, which can be uniformly chosen between 1 and $N_p - 1$. Moreover, the mutation operation can be applied which mutates (alters) a gene at a random position in chromosomes with a given small probability $p_m$. In the case of the binary alphabet, this change can correspond to complementing the corresponding bits; simply replace each bit with probability $p_m$ from 0 to 1, or vice versa. As the objective is to find the optimal RRH clustering, the mutation probability can be set to very small (e.g., 0.01) such that the mutation operation plays only a minor role in the GA relative to the crossover operation. After applying these two operations to the mating pool $M_c(t)$, the disclosed systems and methods obtain the new population $P_c(t+1)$.

The procedure operations of selection, crossover, mutation, and fitness evaluation can be iteratively repeated until either (i) the fitness function converges, (ii) a maximum number of generations is reached, or (iii) after a maximum number of stall generations with no fitness improvement. The chromosome with maximum fitness can then be taken from the last generation as the clustering solution with given C. Finally, the optimal design for software-defined massive MIMO can be yielded by selecting the best $C \in \mathcal{C}$, which provides optimal user sum-rate $\overline{R^{tot}}^*$ and optimal clustering $(C^*; \{I^*_{uc_j}\})$. FIG. 2B summarizes the disclosed GA-based dynamic RRH clustering procedure 250 (e.g., Algorithm 1). The steps can include:

```
1 for each C ∈ C do
2 |   Set t := 0. Generate and evaluate P_C(0).
3 |   while stopping criterion has not been satisfied do
4 |   |   Select M_C(t) from P_C(t).
5 |   |   Crossover and mutate M_C(t) to form
    |   |   P_C(t + 1).
6 |   |   Set t := t + 1. Evaluate P_C(t).
7 |   end
8 |   Update R^tot(C; {I_uc_j}) from the best of P_C(t).
9 end
10 Yield (C*; {I_uc_j*}) = argmax_{C ∈ C} R^tot(C; {I_uc_j}).
```

Performance Evaluation

The performance analysis of macro-diversity massive MIMO can be validated and the spectral efficiency achieved by the disclosed dynamic RRH clustering evaluated. Consider a SoftAir system that has 9 deployed RRHs in a three-by-three grid over an area of 2,300×2,300 [m²]. Each RRH is equipped with multiple antennas and is set apart from its closet RRH by a distance of 660 [m]. Monte Carlo simulations have been performed for each evaluated point.

Figure 3:
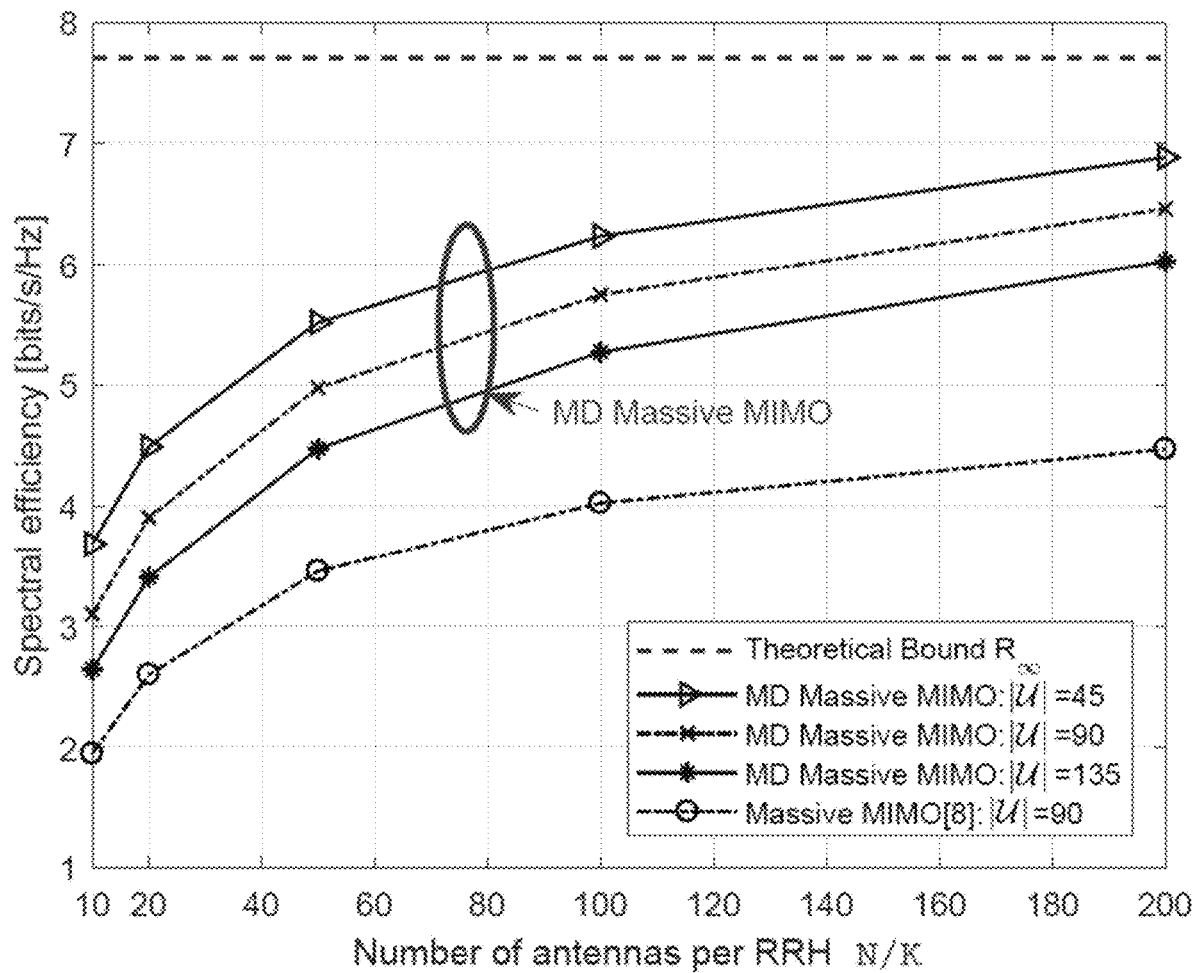
FIG. 3 shows a graph illustrating ergodic achievable rates for different user numbers according to various embodiments of the present disclosure.

Regarding uniformly-distributed users around cell edges (e.g., the worst-case scenario), FIG. 3 shows the achievable rates of conventional massive MIMO and macro-diversity massive MIMO. In the conventional scheme, each RRH operates independently with the other RRHs; in the macro-diversity scheme, a static clustering pattern is selected as 4 RRH clusters (e.g., $c_1=\{1,2,4,5\}$); $c_2=\{3,6\}$; $c_3=\{7\}$; $c_4=\{8, 9\}$) with satisfied fronthaul capacity constraints. Each user is served by the RRH that is closest to itself via the common user association policy. Also, the theoretical bound is obtained via Eq. (11) with $\alpha=0.04$ and $|C|=4$. The result indicates that by grouping RRHs into clusters (even with a static pattern), the macro-diversity scheme reduces the interfering cells and gives much higher rates with the increasing antenna number per RRH (e.g., more antennas to boost the user received power) than that of the conventional scheme. Moreover, given a fixed N/K, when the (total) user number decreases (like $|\mathcal{U}_i|/N \to 0$ in Eq. (11)), each pilot sequence is reused by less users, which in turn decreases the interference and increases the spectral efficiency. The above observations successfully validate the accuracy of the disclosed theoretical analysis.

Figure 4:
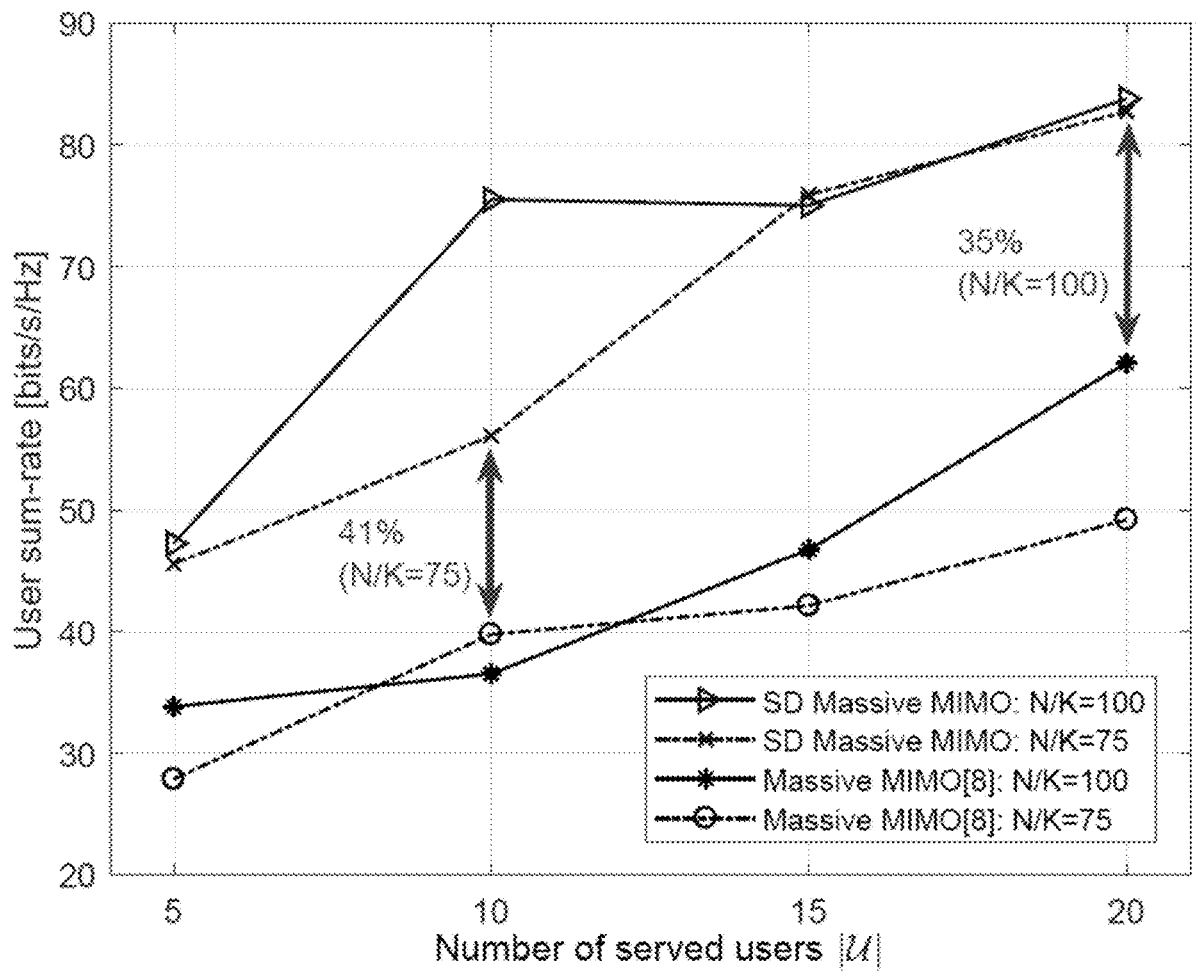
FIG. 4 shows a graph illustrating user sum-rates for different antenna numbers N/K according to various embodiments of the present disclosure.

To evaluate the disclosed dynamic clustering, the disclosed systems and methods investigate the impacts of time-varying user distribution, e.g., when users move around a geographic area. Regarding possible RRH clustering patterns (e.g., set C), one can consider that the pair-distances of all the RRHs in each cluster should less than a predetermined 940 [m] (e.g., due to frontal capacities). Given randomly-distributed mobile users, FIG. 4 shows that the disclosed software-defined massive MIMO via the procedure 250 (e.g., Algorithm 1) can ensure at least 35% sum-rate improvements as compared to conventional massive MIMO. That is, with only 20 generations, the disclosed procedure 250 can achieve the maximum sum-rate in every time slot by dynamically forming the optimal RRH clustering. These confirm the efficacy and adaptiveness of the disclosed dynamic clustering solution, which enables the software-defined massive MIMO for 5G&B systems.

Figure 5:
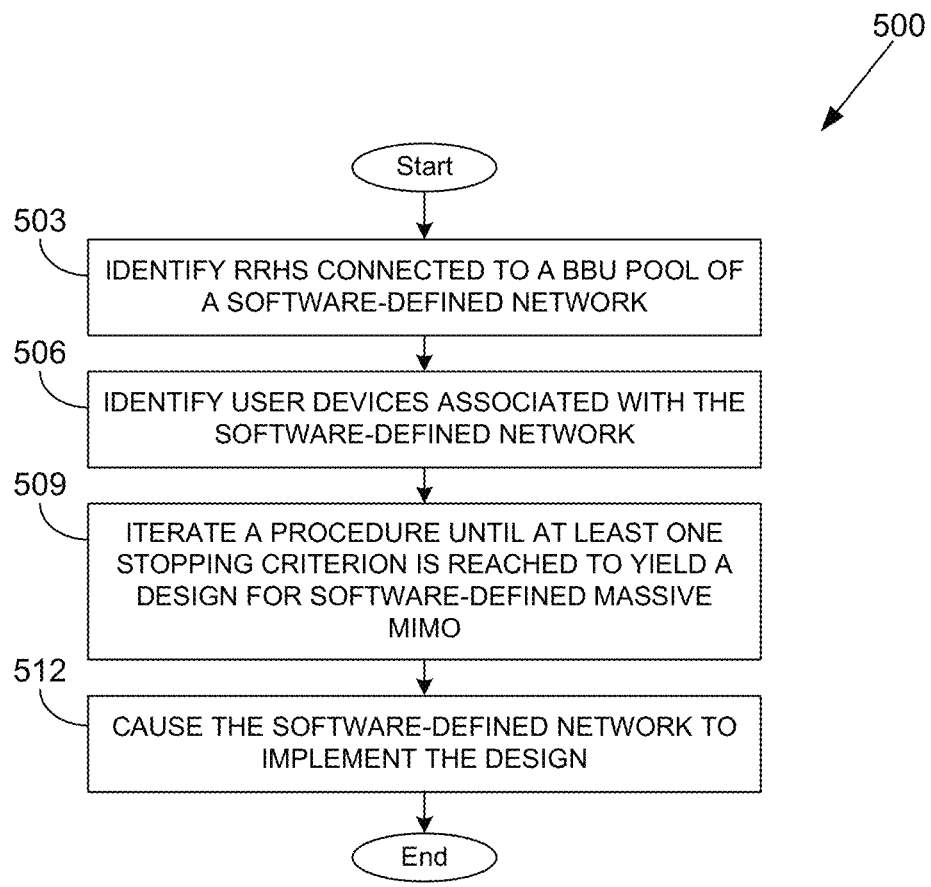
FIG. 5 illustrates an example flowchart of certain functionality implemented by portions of the software-defined massive MIMO framework of FIG. 1 according to various embodiments of the present disclosure.

Referring next to FIG. 5, shown is a flowchart that provides one example of the operation of a process 500 according to various embodiments. It is understood that the flowchart of FIG. 5 provides merely an example of the many different types of functional arrangements that may be employed to implement the operation of the portion of the software-defined massive MIMO framework 100 as described herein. As an alternative, the flowchart of FIG. 5 may be viewed as depicting an example of elements of a method implemented in the software-defined massive MIMO framework 100 (FIG. 1) according to one or more embodiments.

At box 503, the process 500 includes identifying at least one RRH (k) of a plurality of RRHs $\mathcal{K}$) connected to a central BBU pool (VBSs) of a software-defined network (SDN) associated with a communication network (e.g., 5G&B). In some examples, $c_i \subset \mathcal{K}$ is the ith subset of $\mathcal{K}$, which connects to the BBU pool (VBSs) via a fronthaul link with a predetermined capacity ($F_i$). At box 506, the process 500 includes identifying at least one user device (u) of a plurality of user devices ($\mathcal{U}$) associated with the SDN.

At box 509, the process 500 includes iterating a procedure 250 until at least one stopping criterion is reached to yield a design ($C^*$; $\{I^*_{uc_j}\}$) for software-defined massive MIMO subject to a plurality of constraints comprising at least a system level constraint and an association constraint. In some examples, the procedure 250 includes selection, crossover, mutation, and fitness evaluation operations of a genetic algorithm. Examples of the system level constraints include the fronthaul capacity ($F_i$) of the fronthaul links. Examples of the association constraint include each one of the plurality of clusters ($c_i$) being dedicated to a subset of the RRHs ($c_i \subset \mathcal{K}$) (e.g., for each $u \in \mathcal{U}$, $\Sigma_{c_i \in C} I_{uc_i} = 1$).

The at least one stopping criterion of the procedure 250 can include: convergence of a fitness function ($f$), a predefined number of total generations being reached, or a predefined number of stall generations being reached. The design ($C^*$; $\{I^*_{uc_j}\}$) can maximize a user sum rate ($\overline{R}^{tot*}$) at the user devices ($\mathcal{U}$).

In some examples, the design ($C^*$; $\{I^*_{uc_j}\}$) provides a plurality of clusters ($c_i \in C$) comprising a subset of the plurality of RRHs ($c_i \in \mathcal{K}$) to mitigate an impact due to intra-cluster interference, inter-cluster interference, and pilot contamination induced interference to provide spectral efficiency $$\left(|\mathcal{U}|\kappa\left(1 - \frac{B}{S}\right) \log_2(\eta_\infty)\right)$$

to the communication network. The design ($C^*$; $\{I_{uc_j}\}$) also provides an association (e.g., $I_{uc_i}$ or $\{I^*_{uc_j}\}$) of user devices ($\mathcal{U}$) to the plurality of clusters ($c_i$).

At box 512, the process 500 includes causing the SDN to implement the design ($C^*$; $\{I^*_{uc_j}\}$) or initiating implementation of the design ($C^*$; $\{I^*_{uc_j}\}$) by the SDN. In some examples, initiating implementation of the design ($C^*$; $\{I^*_{uc_j}\}$) comprises causing at least one computing device 600 (FIG. 6) to associate the user devices ($\mathcal{U}$) to the plurality of clusters ($C^*$) according to the association ($\{I^*_{uc_j}\}$). Thereafter the process can proceed to completion.

Figure 6:
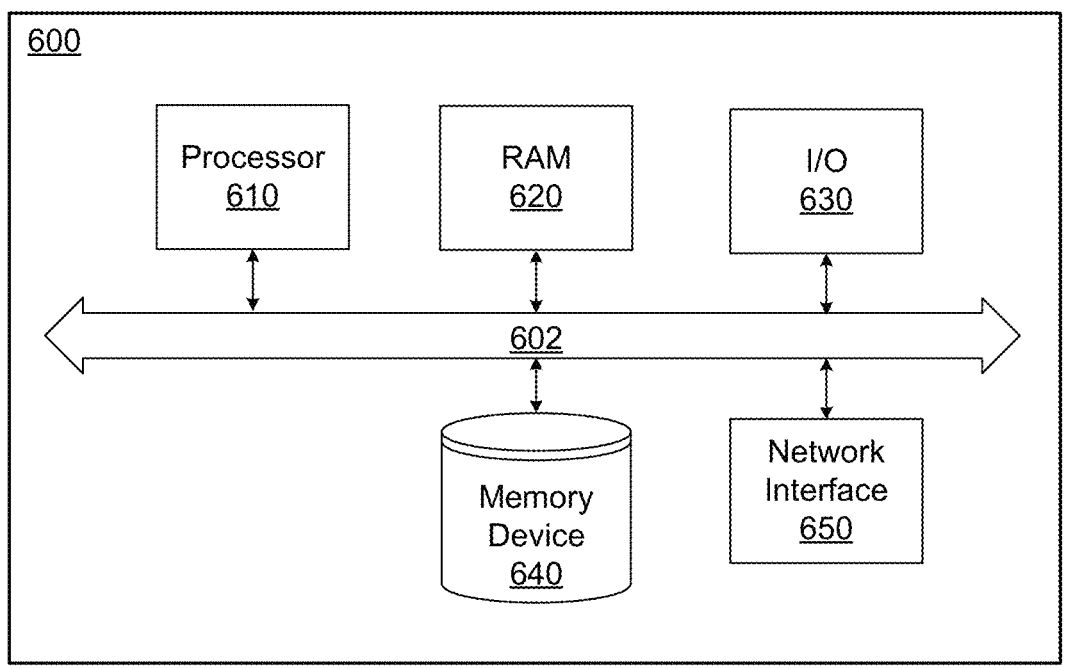
FIG. 6 is a schematic block diagram that illustrates an example computing environment employed in the software-defined massive MIMO framework of FIG. 1 according to various embodiments of the present disclosure.

Turning to FIG. 6, an example hardware diagram of a general purpose computer 600 is illustrated. Any of the processed, techniques, and methods discussed herein may be implemented, in part, using one or more elements of the general purpose computer 600. The computer 600 includes a processor 610, a Random Access Memory ("RAM")/a Read Only Memory ("ROM") 620, an Input Output ("I/O") interface 630, a memory device 640, and a network interface 650. The elements of the computer 600 are communicatively coupled via a bus 602.

The processor 610 comprises any known general purpose arithmetic processor or Application Specific Integrated Circuit ("ASIC"). The RAM/ROM 620 comprise any known random access or read only memory device that stores computer-readable instructions to be executed by the processor 610. The memory device 630 stores computer-readable instructions thereon that, when executed by the processor 610, direct the processor 610 to execute various aspects of the present disclosure described herein. When the processor 610 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 630 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 650 comprises hardware interfaces to communicate over data networks. The I/O interface 630 comprises device input and output interfaces such as keyboard, pointing device, display, communication, and other interfaces. The bus 602 electrically and communicatively couples the processor 610, the RAM/ROM 620, the I/O interface 630, the memory device 640, and the network interface 650 so that data and instructions may be communicated among them.

In operation, the processor 610 is configured to retrieve at least one application comprising computer-readable instructions stored on the memory device 640, the RAM/ROM 620, or another storage means, and copy the computer-readable instructions to the RAM/ROM 620 for execution, for example. The processor 610 is further configured to execute the computer-readable instructions to implement various aspects and features of the present disclosure. For example, the processor 610 may be adapted and configured to execute the processes described above, including the processes described as being performed as part of a software-defined massive MIMO framework 100, a genetic algorithm, or a software-defined network (SDN). Also, the memory device 640 may store identification data for the SDN, or for resources associated with the SDN including the RRHs and configurations of clusters formed from individual subsets of the RRHs. The memory device 640 may also store data about constraints, identifications of user devices, and associations of the user devices to the clusters.

It should be emphasized that the described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. The term "about" can include traditional rounding according to significant figures of numerical values. In addition, the phrase "about 'x' to 'y'" includes "about 'x' to about 'y'".

Therefore, at least the following is claimed:

1. A system, comprising:
    at least one computing device coupled to a network;
    at least one application executable in the at least one computing device, the at least one application causing the at least one computing device to:
        define a configuration of a plurality of clusters formed from individual subsets of a plurality of remote radio heads (RRHs) available to a communication network and an association of user devices to the plurality of clusters, where the defined configuration and association mitigates impact of interference and pilot contamination;
        configure the individual subsets of the plurality of RRHs into the plurality of clusters based upon the defined configuration; and
        associate the user devices to the plurality of clusters based upon the defined association.

2. The system of claim 1, wherein the system provides dynamic macro-diversity massive MIMO with respect to a time-varying distribution of the user devices.

3. The system of claim 1, wherein defining the configuration comprises the at least one application further causing the at least one computing device to iterate a procedure until at least one stopping criterion is reached.

4. The system of claim 1, wherein the system achieves a sum-rate improvement in every time slot by dynamically forming the plurality of clusters.

5. A method, comprising:
    identifying resources available to a communication network;
    identifying user devices associated with the communication network;
    determining a configuration of the resources and an association of the user devices to the configuration to provide spectral efficiency to the communication network;
    configuring the resources based at least in part on the configuration; and
    associating the user devices based at least in part on the association.

6. The method of claim 5, wherein the determining is based at least in part on a genetic algorithm.

7. The method of claim 5, wherein the communication network is associated with a software-defined network.

8. The method of claim 5, wherein the resources comprise at least one of: remote radio heads (RRHs), virtual base stations (VBSs), and base band units (BBUs).

9. The method of claim 5, wherein the method provides dynamic macro-diversity massive MIMO with respect to a time-varying distribution of the user devices.

10. A system, comprising:
    at least one computing device coupled to a network;
    at least one application executable in the at least one computing device, the at least one application causing the at least one computing device to:
        identify a plurality of remote radio heads (RRHs) connected to a central base band unit (BBU) pool of a software-defined network (SDN) associated with a communication network, the plurality of RRHs connected to the BBU pool via a plurality of fronthaul links;
        identify a plurality of user devices associated with the SDN;
        iterate a procedure until at least one stopping criterion is reached to yield a design for software-defined massive MIMO subject to a plurality of constraints comprising at least a system level constraint and an association constraint; and
        initiate implementation of the design by the SDN.

11. The system of claim 10, wherein the procedure comprises selection, crossover, mutation, and fitness evaluation operations.

12. The system of claim 10, wherein the at least one stopping criterion comprises: convergence of a fitness function, a predefined number of total generations being reached, or a predefined number of stall generations being reached.

13. The system of claim 10, wherein the design maximizes a user sum rate at the user devices.

14. The system of claim 10, wherein the system level constraint comprises a fronthaul capacity of the fronthaul links.

15. The system of claim 10, wherein the design provides a plurality of clusters comprising a subset of the plurality of remote radio heads (RRHs) to mitigate an impact due to intra-cluster interference, inter-cluster interference, and pilot contamination induced interference to provide spectral efficiency to the communication network.

16. The system of claim 15, wherein the design provides an association of the user devices to the plurality of clusters.

17. The system of claim 15, wherein the association constraint comprises each one of the plurality of clusters being dedicated to the subset of the plurality of remote radio heads (RRHs).

18. The system of claim 17, wherein initiate implementation of the design by the SDN comprises the at least one application further causing the at least one computing device to associate the user devices to the plurality of clusters according to the association.

19. The system of claim 15, wherein the plurality of constraints further comprises a pair-distance constraint specifying that pair-distances of RRHs in each of the plurality of clusters should be less than a predetermined value.

\* \* \* \* \*